US011349882B2

(12) United States Patent
Verma

(10) Patent No.: US 11,349,882 B2
(45) Date of Patent: May 31, 2022

(54) CONNECTING DEVICES TO THE CLOUD

(71) Applicant: SIEMENS AKTIENGESELLSCHAFT, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 16/464,016

(22) PCT Filed: Oct. 18, 2017

(86) PCT No.: PCT/EP2017/076546
§ 371 (c)(1),
(2) Date: May 24, 2019

(87) PCT Pub. No.: WO2018/099647
PCT Pub. Date: Jun. 7, 2018

(65) Prior Publication Data
US 2019/0379706 A1 Dec. 12, 2019

(30) Foreign Application Priority Data
Nov. 29, 2016 (EP) .................................... 16201204

(51) Int. Cl.
*G06F 15/16* (2006.01)
*H04L 9/40* (2022.01)
*H04L 67/1097* (2022.01)

(52) U.S. Cl.
CPC ........ *H04L 63/205* (2013.01); *H04L 63/0272* (2013.01); *H04L 63/0428* (2013.01); *H04L 63/102* (2013.01); *H04L 67/1097* (2013.01)

(58) Field of Classification Search
CPC ............... H04L 63/265; H04L 63/0272; H04L 63/0428; H04L 67/0197; H04L 63/102; H04L 63/205; H04L 67/1098
(Continued)

(56) References Cited

U.S. PATENT DOCUMENTS 8,468,244 B2 * 6/2013 Redlich .................. G06Q 10/06
715/255
8,830,057 B1 9/2014 Poursohi et al.
(Continued)

FOREIGN PATENT DOCUMENTS

CN 103002445 A 3/2013
CN 103201717 A 7/2013
(Continued)

OTHER PUBLICATIONS

European Search Report for European Patent Application No. 16201204.1-1870 dated Feb. 10, 2017.
(Continued)

*Primary Examiner* — Khanh Q Dinh
(74) *Attorney, Agent, or Firm* — Lempia Summerfield Katz LLC

(57) ABSTRACT

A method is provided for securely connecting devices to the cloud by virtue of a particular device being connected to a concierge service of the cloud and transmitting information relating to the security functions offered by the device to the service, whereupon the concierge service determines, based on the information which is transmitted by the requesting device and relates to the security functions of the latter, a security profile which is appropriate for the device and connects the requesting device to a communication channel appropriate for the determined security profile.

11 Claims, 3 Drawing Sheets

(58) Field of Classification Search
USPC .................. 709/220, 223, 225, 227, 228
See application file for complete search history.

(56) References Cited

U.S. PATENT DOCUMENTS

| | | | |
|---|---|---|---|
| 9,032,535 B2* | 5/2015 | Lin | H04N 21/4367 726/26 |
| 9,087,189 B1 | 7/2015 | Koeten | |
| 9,094,407 B1* | 7/2015 | Matthieu | H04L 63/10 |
| 10,305,920 B2* | 5/2019 | Balasubramanian | H04L 63/1416 |
| 10,536,470 B2* | 1/2020 | Balasubramanian | H04L 63/1433 |
| 10,666,669 B2* | 5/2020 | Balasubramanian | H04L 63/1441 |
| 2007/0061878 A1 | 3/2007 | Hagiu | |
| 2009/0240728 A1* | 9/2009 | Shukla | G06F 16/83 |
| 2009/0248737 A1* | 10/2009 | Shukla | G06F 9/44 |
| 2009/0254372 A1* | 10/2009 | Bartholomew, III | G16H 10/20 705/2 |
| 2009/0254572 A1* | 10/2009 | Redlich | G06Q 10/107 |
| 2010/0250497 A1* | 9/2010 | Redlich | H04L 63/105 707/661 |
| 2011/0162075 A1* | 6/2011 | Lin | H04N 21/835 713/168 |
| 2013/0125225 A1 | 5/2013 | Candelore | |
| 2013/0238502 A1 | 9/2013 | Andreoli et al. | |
| 2014/0181319 A1 | 6/2014 | Chen | |
| 2014/0181916 A1 | 6/2014 | Koo et al. | |
| 2014/0373104 A1* | 12/2014 | Gaddam | H04L 63/105 726/4 |
| 2015/0188949 A1 | 7/2015 | Mahaffey | |
| 2016/0028688 A1 | 1/2016 | Chizhov et al. | |
| 2016/0150072 A1* | 5/2016 | Rangarajan | H04W 52/0277 455/574 |
| 2016/0219060 A1 | 7/2016 | Karunakaran | |
| 2018/0063164 A1* | 3/2018 | Balasubramanian | H04L 63/102 |
| 2018/0109549 A1* | 4/2018 | Balasubramanian | H04L 63/1441 |
| 2018/0344913 A1* | 12/2018 | Nguyen | A61M 1/1621 |
| 2019/0104142 A1* | 4/2019 | Balasubramanian | H04L 63/102 |

FOREIGN PATENT DOCUMENTS

| | | |
|---|---|---|
| CN | 104246807 A | 12/2014 |
| CN | 105812428 A | 7/2016 |
| CN | 105900396 A | 8/2016 |
| JP | 2009508261 A | 2/2009 |
| JP | 2016510524 A | 4/2016 |

OTHER PUBLICATIONS

PCT International Search Report and Written Opinion of International Searching Authority dated Jan. 17, 2018 corresponding to PCT International Application No. PCT/EP2017/076546 filed Oct. 18, 2017.
PCT Preliminary Examination Report dated Mar. 25, 2019, for corresponding PCT/EP2017/076546.
Japanese Office Action for Japanese Patent Application No. 2019-528709 dated Jul. 28, 2020, with English translation.
Chinese Office Action for Chinese Patent Application No. 2017800735404 dated Jan. 5, 2021, with English translation.
Yan, Xuehu et al, "When the the Portable Device is Connected to the Cloud Computing", School of Computer Science and Technology; Intelligent Computer and Applications; vol. 5; No. 3; 2015; 2 pp.

* cited by examiner

CONNECTING DEVICES TO THE CLOUD

The present patent document is a § 371 nationalization of PCT Application Serial No. PCT/EP2017/076546, filed Oct. 18, 2017, designating the United States, which is hereby incorporated by reference, and this patent document also claims the benefit of European Patent Application No. EP16201204.1, filed Nov. 29, 2016, which is also hereby incorporated by reference.

TECHNICAL FIELD

The disclosure relates to a method for connecting devices (e.g., clients) to what is known as the cloud, for using applications, platforms, and information technology (IT) infrastructure made accessible over the Internet, an intranet, and the like, for example. The disclosure further relates to a computer program having an implementation of the method and a processing unit, (for example, in the form of what is known as a gateway), for carrying out the method.

BACKGROUND

The use of cloud services is becoming more and more usual and this is equally true for what are known as Industrial Internet of Things (IIoT) applications. A problematic aspect, however, is the wide variety of security risks when using cloud services. Thus there may be a threat of violating the confidentiality and integrity of the data, for example through unauthorized eavesdropping on the data transferred into the cloud and/or through changing data transferred into the cloud or retrieved from the cloud.

A method for connecting a device to the cloud is known from U.S. Pat. No. 9,087,189, wherein the device connects to a special gateway and the gateway transfers information about a security status of the device. Only when the security status corresponds to the requirements defined in a guideline is the connection into the cloud possible. Within the framework of such a guideline, the requesting device may have security software, (e.g., a version of the security software predetermined in the guideline), authorization for specific types of key, and/or antivirus software or a firewall.

SUMMARY AND DESCRIPTION

The scope of the present disclosure is defined solely by the appended claims and is not affected to any degree by the statements within this summary. The present embodiments may obviate one or more of the drawbacks or limitations in the related art.

An object of the present disclosure includes specifying a method for secure connection of devices (e.g., clients) to the cloud.

According to the method, for secure connection of a device (e.g., client) to the cloud, a special service, referred to below as the concierge service, is used. For the use of this concierge service, the method disclosed herein for secure connection of a device (e.g., client) to the cloud includes the following acts. The client connects itself to the concierge service of the cloud and transfers to the service information relating to the security function or security functions offered by the client. The concierge service establishes an appropriate security profile for the requesting client based on the information transferred by the client about this security function or these security functions. Additionally, the concierge service connects the requesting client to a communication channel appropriate for the established security profile from a group of channels or acts as an agent for such as connection.

The advantage of the approach includes each client being connected, depending on the security functions provided by the client, to a communication channel appropriate thereto from a group of communication channels. In this way, clients with powerful security functions and a corresponding security profile may be handled differently from clients with less powerful security functions or without security functions and an associated security profile. This creates monitoring and control options for the use of services made available by the cloud that were not previously provided. Consequently, the result is an improved security for the user of the respective client and enhanced security for users of other clients that use the same services in the cloud.

The assignment of a respective communication channel from a group of communication channels to a respective client depending on the client's security profile makes possible in such cases, for example, the security profile-dependent use of encrypted communication over the individual communication channels in such a way that a client with powerful security functions and a corresponding security profile uses a communication channel that fully supports the respective communication functions, while a client with less powerful security functions or without security functions for example uses a communication channel via which data may also be transmitted unencrypted.

For example, a communication channel appropriate to a security profile may be selected from a group of communication channels depending on a security profile of a client/device and the communication with the cloud may then be undertaken via the selected communication channel. Thus, a selection of a communication channel from a group of communication channels depending on a security profile of the requesting client is possible.

The group of communication channels involves parallel communication channels (e.g., at least in sections), which are configured or are able to be configured along at least one section between the cloud or one or more applications in the cloud, in particular, one or more services in the cloud on the one hand and the requesting device or the requesting client on the other hand. The device or the client is then connected or is able to be connected to the cloud or to one more applications in the cloud, in particular, one or more what are known as services in the cloud, via a selected communication channel, or a communication channel may include one or more micro services or consist of one or more micro services. In such cases, the communication channels of a group of communication channels may be distinguished from one another in respect of the function of one or more micro services and/or the number of the micro services and/or the order of the micro services. One or more or all communication channels may be formed, for example, from one or more of the micro services. For this purpose, one or more micro services may be selected as a function of the security profile or the security function of the device or of the client. In such cases, different micro services may also be selected for different security functions and/or different security profiles.

In one form of embodiment of the method, the connection of a device (e.g., client) to a communication channel appropriate to the established security profile of the client is linked to an enabling of predetermined or predeterminable first micro services from a group of first micro services for the device. The fact that the connection of the client to the communication channel is linked to an enabling of specific micro services, namely services referred to, so as to distinguish them, as first micro services, which allow data to be stored in the cloud, for example, means that the connection to the communication channel and the enabling of specific first micro services occurs simultaneously or at least in conjunction, for example, in that each communication channel is assigned to a specific first micro service or to a plurality of specific first micro services. The enabling of only specific first micro services restricts the option of storing data in the cloud, changing data, and/or deleting data in accordance with the respective security profile established for the respective client and guarantees that clients with a high security profile are given other and expanded options than clients with a comparatively lower security profile.

In an additional or alternate form of embodiment of the method the connection of a device (e.g., client) to a communication channel appropriate to the established security profile of the client is linked to an activation of predetermined or predeterminable second micro services from a group of second micro services for monitoring the data transmitted via the communication channel. The fact that the connection of the client to the communication channel is linked to an enabling of specific micro services, namely services referred to, so as to distinguish them, as second micro services, (for example, services for authentication and/or authorization of a client), means that the connection to the communication channel and the enabling of specific second micro services occurs simultaneously or at least in conjunction, for example, in that each communication channel is assigned to a specific second micro service or to a plurality of specific second micro services. While a data transmission is possible, for example, using different powerful cryptographic algorithms via different communication channels, the activation of specific second micro services allows checking of the transmitted data or the like, even with a communication channel for unencrypted data transmission for example.

In a further form of embodiment of the method, the connection of a device (e.g., client) to a communication channel appropriate to the established security profile of the client is undertaken in accordance with the data in a channel configuration database assigned to the concierge service or at least accessible for the concierge service. The channel configuration database makes possible a simple and where necessary also dynamically variable parameterization of the secure connection of a client to the cloud proposed here. The channel configuration database optionally also includes data relating to the first micro services that are enabled for the respective client for a connection of a client to a specific communication channel and/or data relating to the second micro services that are activated for a connection of a client to a specific communication channel for the data transmitted via the respective communication channel. This data too is optionally dynamically variable and thus allows an even greater ability to set parameters of the method for secure connection of a client to the cloud proposed here.

The object stated at the outset is also achieved by a processing unit functioning as an interface unit in the cloud or to the cloud, e.g., a processing unit in the form of a gateway or node computer or the like. The processing unit may be configured to carry out the method described herein. The method may be implemented in software. The disclosure thus includes a computer program with program code instructions able to be executed by a computer in the form of the processing unit and a storage medium, e.g., a computer program product with program code media as well as a processing unit into the memory of which such a computer program is loaded or is able to be loaded to carry out the method and its embodiments disclosed herein.

For the further description, to avoid unnecessary repetitions, it is true to say that features and details that are described in conjunction with the method for secure connection of a client to the cloud as well as any possible embodiments, naturally also apply in conjunction with and in respect of the processing unit intended for and configured for the execution of the method and vice versa, so that the processing unit may also be developed in accordance with individual or with a number of method features, in that the processing unit is configured to carry out the method features.

The method described below for connecting devices to the cloud is implemented for automatic execution in the form of a computer program, if necessary, also in the form of a distributed computer program. The computer program is intended for execution by at least one processing unit functioning as an interface in the cloud (gateway, node computer). When method acts or method act sequences are described below, these relate to actions that take place automatically and without the intervention of a user based on the computer program or under control of the computer program. Use of the term "automatically" at least means that the action concerned takes place based on the computer program or under control of the computer program.

It is self-evident to the person skilled in the art that, instead of an implementation of the method proposed here in software, an implementation in firmware or in firmware and software is also possible in the same way. Thus, it is intended that the description given here may be construed as the term software or the term computer program also including other implementation options, namely in particular an implementation in firmware or in firmware and hardware.

BRIEF DESCRIPTION OF THE DRAWINGS

Exemplary embodiments are explained in greater detail below with reference to the drawings. Objects or elements corresponding to one another are provided with the same reference numbers in the figures.

The exemplary embodiments are not to be understood as restricting the disclosure. Instead, expansions and modifications are also entirely possible within the framework of the present disclosure, in particular those that are able to derived by the person skilled in the art for example by combination or variation of the individual features or method acts described in conjunction with the general or specific part of the description and also contained in the claims and/or in the drawings in respect of the achievement of the object and lead by combinable features to a new subject matter or to new method acts or method act sequences.

DETAILED DESCRIPTION

Figure 1:
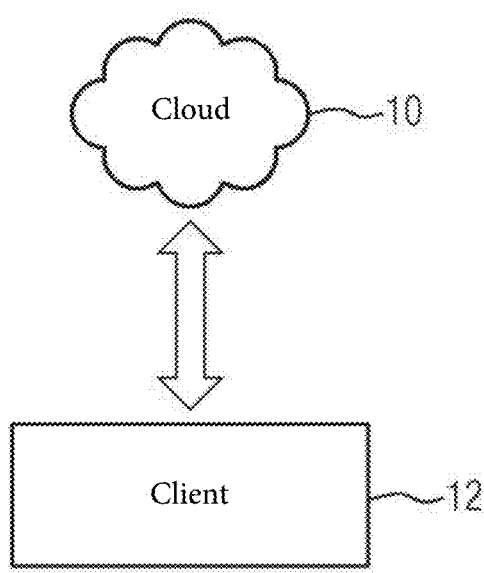
FIG. 1 depicts an example of the cloud and a device that is connected to or is to be connected to the cloud for using services provided therein.

FIG. 1 is a schematic simplified overview diagram and on the one hand shows symbolically what is known as the cloud 10 and on the other hand shows a device 12 that is to be connected to the cloud 10 for communicative connection therewith. The cloud 10, in a known manner, includes a plurality of devices or servers connected to one another communicatively (for example, via the Internet). To make a distinction between the cloud and the devices included in the cloud 10, the device 12 not belonging to the cloud 10 that is to be connected to the cloud 10 is also sometimes referred to below as the client 12. The type and/or the number of the devices included in the cloud 10 is not of significance for the client 12 and is normally also not known.

In the disclosure herein, it is a matter of practically no safety precautions previously having been taken when connecting a client 12 to the cloud 10. Theoretically, therefore great damage may be inflicted when a "malicious" client 12 is connected to the cloud 10, by data stored in the cloud 10 being deleted or changed or by malicious programs being infiltrated into the cloud 10 for example.

Figure 2:
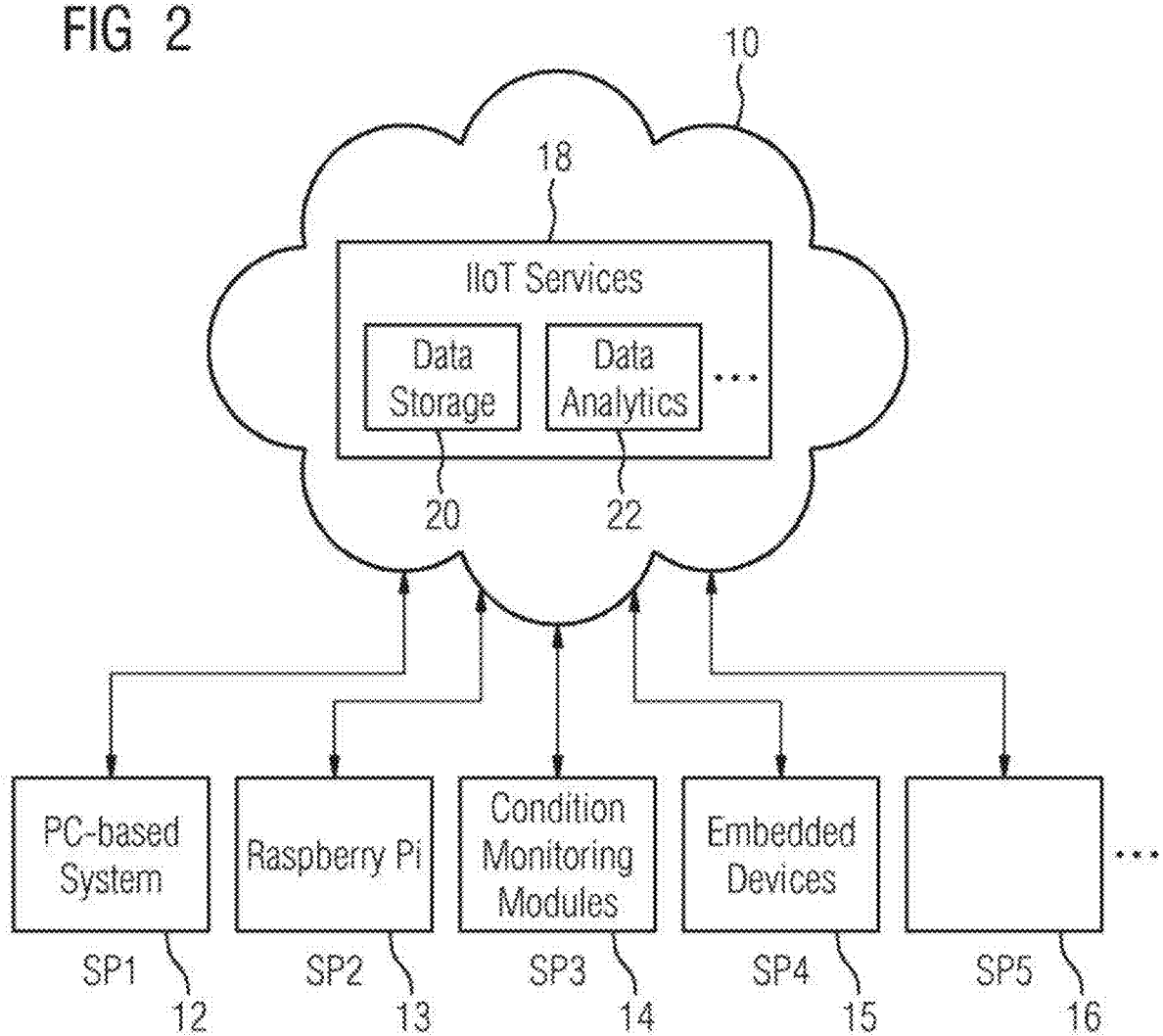
FIG. 2 depicts examples of various devices that come into consideration for a connection to the cloud and for using services provided therein.

The diagram in FIG. 2 shows a scenario, based on the diagram in FIG. 1, such as forms the basis of the disclosure presented here. Accordingly, there is the option of seeking connection to the cloud 10 with different devices (e.g., clients). PC-based systems, what are known as intelligent sensors (e.g., smart sensors) and/or sensor gateways (based on Raspberry Pi, for example), automation or control devices (for example, programmable logic controllers (PLC) or devices of a process control system (DCS, PLS)), condition monitoring devices and the like come into consideration as clients 12, 13, 14, 15, 16, in any event devices that, when operating, belong to an automation solution for control and/or monitoring of a technical process. Within the cloud 10, the clients 12-16 are available to Industrial Internet of Things (IIoT) services, including, for example, services 20 for storage of data in the cloud 10 (e.g., data storage) and services 22 for data analytics with resources of the cloud 10.

The type of the respective client 12-16 and basically also the type of services 18-22 used in the cloud 10 is not a matter of importance below. However, it is to be noted that the various clients 12-16 differ in respect of their respective processing power, for example, and thus also different security functions or security profiles are associated with the respective client 12-16. The respective scope of security functions or security profiles provided is indicated in the diagrams for examples with SPx (SP=Security Profile) and to this extent the diagram in FIG. 2 shows that clients 12-16 connected/connecting to the cloud 10 bring with them different security functions and security profiles in each case (SP1, SP2, SP3, SP4, SP5). For precise designation of a client 12-16 with specific security functions and a security profile resulting therefrom, the respective client 12-16 may also be referred to for example as SP1 client 12, SP2 client 13, SP3 client 14, SP4 client 15 and SP5 client 16.

Each device 12-16 that uses services 18-22 provided by the cloud 10, depending on its respective security functions and a security profile resulting therefrom, represents a potential risk for the functionality provided by the cloud 10 (e.g., cloud platform).

A client 12-16 in the form of a PC-based system, for example, possesses more than sufficient computing power for using basically complex cryptographic algorithms (for example, SSL/TSL) and may have software for recognizing malicious programs (e.g., virus scanners, trojans, etc.). Such a client 12-16 possesses powerful security functions and accordingly a security profile with a highest or at least a high security level (SP1) may be assigned to the client. Security profiles of a lower level (SP2) may be produced when such a client 12-16 involves an older computer system or a PC-based system with a lower power and accordingly fewer powerful security functions or with a number of security functions reduced overall. With such clients 12-16 for example there is a limitation of the length of the keys used for an encrypted data transmission and/or fewer powerful, but also fewer computing-intensive, cryptographic algorithms are used. Security profiles of another level down (SP3) may be given for example for a client 12-16 in the form of what is known as an embedded system (for example, for condition monitoring). Such clients 12-16, for example, because of their limited computing power, make possible only a symmetrical encryption of the data exchanged with the services 18 provided in the cloud 10 instead of a basically more secure asymmetrical encryption. Another level further down (SP4) is provided when a client 12-16 only makes an encrypted data transmission possible for specific data and other data is transmitted unencrypted. Clients 12-16 with a security profile of a lowest level (SP5) may receive and transmit data from and to the cloud 10 and the services 18 used there unencrypted, for example.

The description given below (without foregoing any further general applicability) is continued based on a cloud platform by which IIoT services 18-22 are provided. Because such services 18-22 may be used by a very wide variety of devices (e.g., clients) 12-16 and from different manufacturers, there is a not insignificant risk of an attacker attempting to obtain access to the services 18-22 provided in the cloud 10 by a "malicious" client 12-16 or by "hacking" a client 12-16. Protecting the services 18-22 provided in the cloud 10 makes access to the services 18-22 provided there more difficult and increases the security of the use of such services 18-22 and this ultimately increases the security of connected authorized and "benign" clients 12-16.

The innovation proposed here is based on the knowledge that, in the current situation, no client-specific handling of individual clients 12-16 that wish to use services 18-22 in the cloud 10 is provided. To solve this problem a handling depending on the respective security profile (SP1, SP2, etc.) at least of the requests and/or data sent by the respective client 12-16 into the cloud and to the respective service 18-22 is provided. Optionally, the security profile-dependent handling extends to requests/data sent by the respective client 12-16 into the cloud 10 and to responses/data sent from the cloud 10 to the respective client 12-16.

For this purpose, a specific service is provided on the cloud 10 side, which to a certain extent monitors the access to the cloud 10, in particular, to individual services 18-22 kept in the cloud 10. The service accordingly functions like a concierge, who, for example, in relation to a building or a presence, supervises the access to the building or presence. This service, to distinguish it linguistically below from other services 18-22 available in the cloud 10, is referred to in the figure depicted here as the concierge service 24 (FIG. 3).

Figure 3:
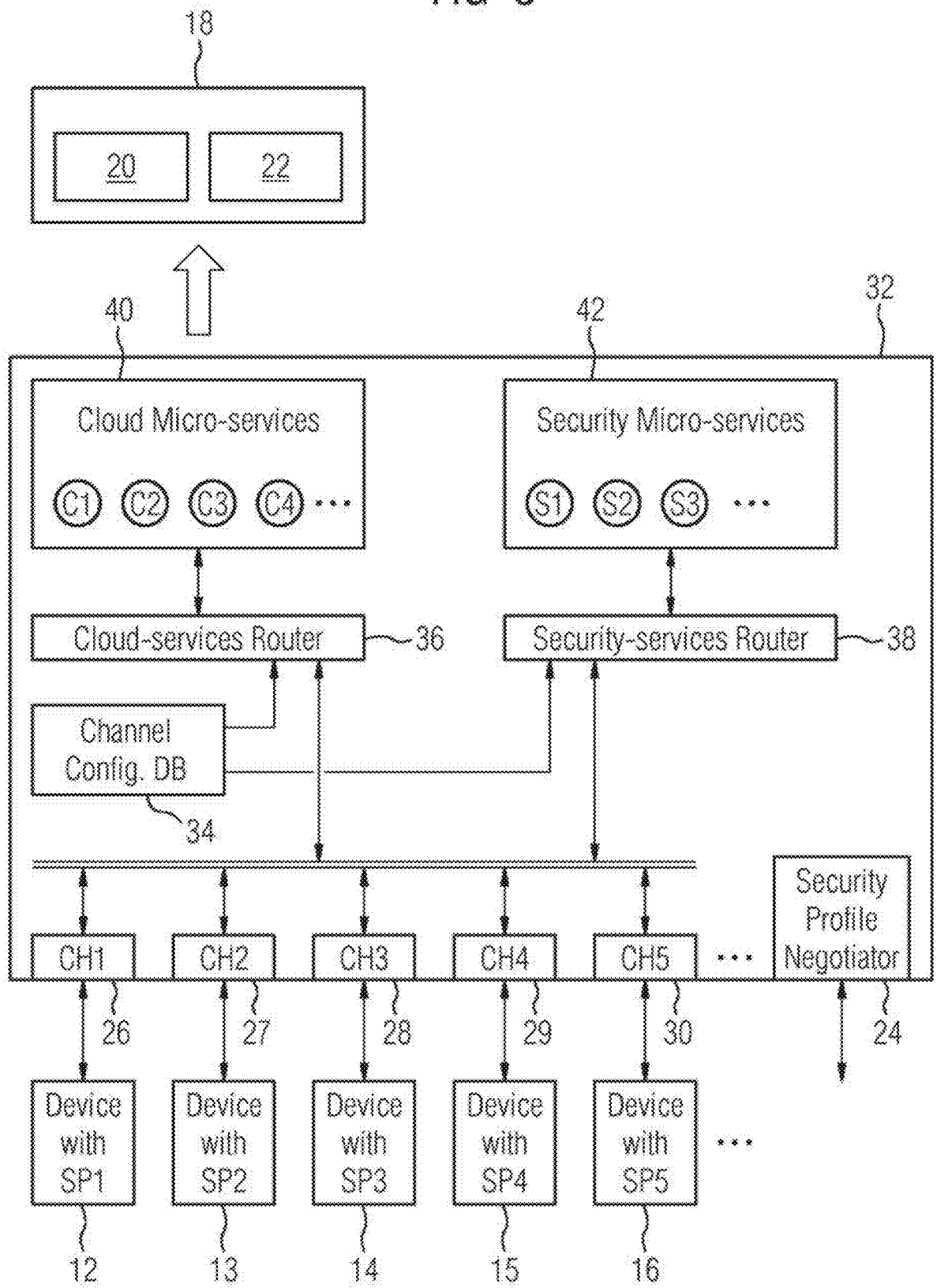
FIG. 3 depicts an example of a security function functioning as an interface between one device or a plurality of devices.

The diagram in FIG. 3 shows the concierge service 24 and a snapshot of a situation in which the concierge service 24 has connected individual clients 12-16 in accordance with their respective security profile to a communication channel 26, 27, 28, 29, 30 appropriate to the respective security profile into the cloud 10 (symbolically the communication channels 26-30 shown schematically by way of example in FIG. 3 are additionally labeled CH1, CH2, CH3, CH4 and CH5). A plurality of communication channels 26-30 is available for the connection of a client 12-16 to a communication channel 26-30 and the concierge service 24 selects from the group of communication channels 26-30 the communication channel 26-30 appropriate to the respective client 12-16. The concierge service 24 may accordingly and corresponding to the function explained below with further details, also be referred to as the Security Profile Negotiator.

The concierge service 24 is part of an interface 32 implemented in the cloud 10 for the clients 12-16 that wish to obtain access to services 18-22 of the cloud 10. The concierge service 24 functions within the interface 32 as at least an initial starting point for such clients 12-16. A client 12-16 of this type registers with the concierge service 24 (e.g., a communication connection is thus established between the respective client 12-16 and the concierge service 24) and the client 12-16 transfers to the concierge service 24 information relating to the security functions provided by the device 12-16. The information transferred for this may involve an identifier or the like, which encodes the respective security profile of the client 12-16, thus for example a numeric or alphanumeric identifier, in particular, an alphanumeric identifier in the form of a character sequence, for example, "SP1", "SP2" etc. The information transferred may in addition or as an alternative also involve information, which, for example, encodes a cryptographic algorithm or a plurality of cryptographic algorithms, which the client 12-16 may use, and/or a key length able to be used by the client 12-16 and the like.

On receipt of such information from a client 12-16 seeking an access to a service 18-22 of the cloud 10, the concierge service 24 establishes the security profile of the client 12-16. The establishing of the security profile by the concierge service 24 may include the simplest case of the concierge service 24 interpreting the information received from the respective client 12-16 and directly encoding the security profile of the client 12-16 (for example, in the form of an alphanumeric character sequence such as "SP1"). The establishing of the security profile may also include the concierge service 24 processing the information received from the respective client 12-16 and, for example, evaluating it by a lookup table (LUT) or the like and establishing the security profile on this basis.

Depending on the security profile established, the concierge service 24 connects the requesting client 12-16 to a communication channel 26-30 appropriate to the security profile established. The result of such a connection of a client 12-16 to a communication channel 26-30 appropriate to its security profile is shown, for example, in the diagram of FIG. 3. A first client 12 with a security profile of the highest level (SP1; SP-1 client 12) is connected to a communication channel 26 (CH1) appropriate to the client. Further clients 13, 14, 15, 16 with a lower security profile (SP2, SP3, SP4, SP5) are likewise connected to a respective communication channel 27, 28, 29, 30 (CH2, CH3, CH4, CH5) appropriate to the security profile.

Thus, a communication channel 26-30 appropriate thereto belongs to each security profile, wherein the communication channel 26-30 is thereby appropriate to a security profile that in its turn provides the communication channel 26-30 with appropriate communication options to and with services 18-22 stored in the cloud. A communication channel 26 (CH1) appropriate to the highest security profile (SP1) makes it possible for example to use especially powerful cryptographic algorithms and a communication channel 30 (CH5) appropriate to the lowest security profile (SP5) makes it possible for example to use an unencrypted data transfer to and from a service 18-22 in the cloud 10.

The interface 32 between a client 12-16 and one or more services 18-22 in the cloud 10, as well as the concierge service 24, includes a database 34 (e.g., channel configuration database), a first router 36 for cloud services and to cloud services (e.g., cloud Services Router), a second router 38 for security services and to security services (e.g., Security Services Router) and also first and second services referred to, to distinguish them from the aforementioned services 18-22, as micro services 40, 42.

The first micro services 40 (cloud Micro Services; C1, C2, C3, C4) include services for storage of data in the cloud 10, for example, services for tenant management (Tenant Management Services), services for data analytics, etc., for example, Fleet Management Applications, Benchmarking Applications, Asset Management Applications, Warranty Management Applications or subfunctionalities of such services and applications. The first router 36 (e.g., cloud Services Router) connects a communication channel 26-30 or individual communication channels 26-30 to a first micro service 40 or to individual first micro services 40. The connection of a communication channel 26-30 to a first micro service 40 or to individual first micro services 40 may be made in accordance with the data stored in the channel configuration database 34 and able to be adapted dynamically, (e.g., by a user).

The second micro services 42 (e.g., Security Micro Services; S1, S2, S3, S4) include services for authentication and/or authorization, services for discovering malicious software, services for heuristic security scans, services for analysis of data transmitted within the framework of communication links (e.g., Deep-Packet Inspection), services for what is referred to as sandboxing and so forth. The second router 38 (e.g., Security Services Router), for the data transferred via a communication channel 26-30 or via individual communication channels 26-30 from the client 12-16 into the cloud 10 or optionally from the client 12-16 into the cloud 10 and also from the cloud 10 to the client 12-16, causes a second micro service 42 or individual second micro services 42 to be executed. Also, similar to the assignment of a communication channel 26-30 to a first micro service 40 or to individual first micro services 40, an assignment of a communication channel 26-30 to a second micro service 42 or to individual second micro services 42 exists to this extent. The assignment of a communication channel 26-30 to a second micro service 42 or to individual second micro services 42 may be made in accordance with the data stored in the channel configuration database 34 and able to be adapted dynamically, (e.g., by a user).

It may be defined by the channel configuration database 34, for example, that when the communication channel (CH3) labeled in the figures with the reference number 28 is used for example, specific second micro services 42 (for example, the micro services 42 designated symbolically with S1, S2, and S5) are applied, at least to the data transferred into the cloud 10 via the channel, and that, when this communication channel 28 is used, specific first micro services 40 (for example, the micro services 40 designated symbolically with C1, C3, and C4) may be used. To this extent, data is stored in the channel configuration database 34 that encodes this assignment. Symbolically, this may be written as follows for the example just described: CH3: S={S1, S2, S5}; C={C1, C3, C4}. In general terms, the content of the channel configuration database 34 may accordingly be written as follows for each communication channel 26-30 protected and monitored by the interface 32: CHx: S={Sa ... Sb}|Sa, Sb∈{s1 ... Sn}; C={Ca ... Cb}|Ca, Cb∈{C1 ... Cn}.

In a concrete example, the device 12-16, which as a client 12-16 is seeking connection to the cloud 10 to use one or more of the services 18-22 provided there, is an embedded device, for example, an embedded device for recording, processing, and forwarding of sensor data. When the device does not provide any options for a secured, (e.g., encrypted), data transmission and accordingly may only transmit data into the cloud 10 unsecured and/or not encrypted, the concierge service 24 recognizes the low security profile, for example, a security profile of the lowest security level (SP5). Non-encrypted communication or communication secured in another suitable manner (for example, by a certificate-based authentication of the client 12-16) is susceptible, for example, to what is known as a man-in-the-middle attack. Therefore, all communications into the cloud 10 and to a service 18-22 provided there for such an SP5 client 16 are dealt with via a communication channel 26-30 provided for this purpose, here the communication channel (CH5) labeled with the reference number 30 in FIG. 3 and when this communication channel (CH5) is used by the SP5 client 16, automatically, namely in accordance with the data in the channel configuration database 34, specific second micro services 42 (e.g., Security Micro Services) linked to the communication channel 30 (CH5) for the data transmitted via the communication channel 30 are activated. Thus, the data transferred from the SP5 client 16 into the cloud 10 will be subjected for example to an especially fundamental inspection (e.g., Deep-Packet Inspection) and/or to heuristic security checks (e.g., Heuristic Security Scan). On the other hand, the SP5 client 16 (likewise because of the data in the configuration database 34) only has a restricted access to specific first micro services 40 (e.g., cloud Micro Services) belonging to the low security level. In this way, for example, an SP5 client 16 may only send time series data or the like to a service 20 (e.g., Data Storage) functioning as data storage in the cloud 10 and, for example, not transmit any files and/or not download any files from the cloud 10. Likewise, for example, no micro services 40 for configuring the SP5 client 16 (e.g., Device Management Microservices) may be used. Thus, when a client 12-16 with a low security profile resulting from no or less powerful security functions is taken over by an attacker or an attacker connects into the communication of the client 12-16 with the cloud 10, the opportunities for action by the attacker are restricted and the attacker's ability to eavesdrop on, change, or delete third-party data, for example, will be effectively prevented.

To protect the services 18-22 and/or the data in the cloud 10 and for embedding the approach presented here into the access to the cloud 10, provision is naturally made for an access to the services to be secured 18-22 and to their data only to be possible via the concierge service 24 and in a special form of embodiment by the communication channels 26-30 managed by the interface 32 including the concierge service 24 and/or enabled first micro services 40.

Figure 4:
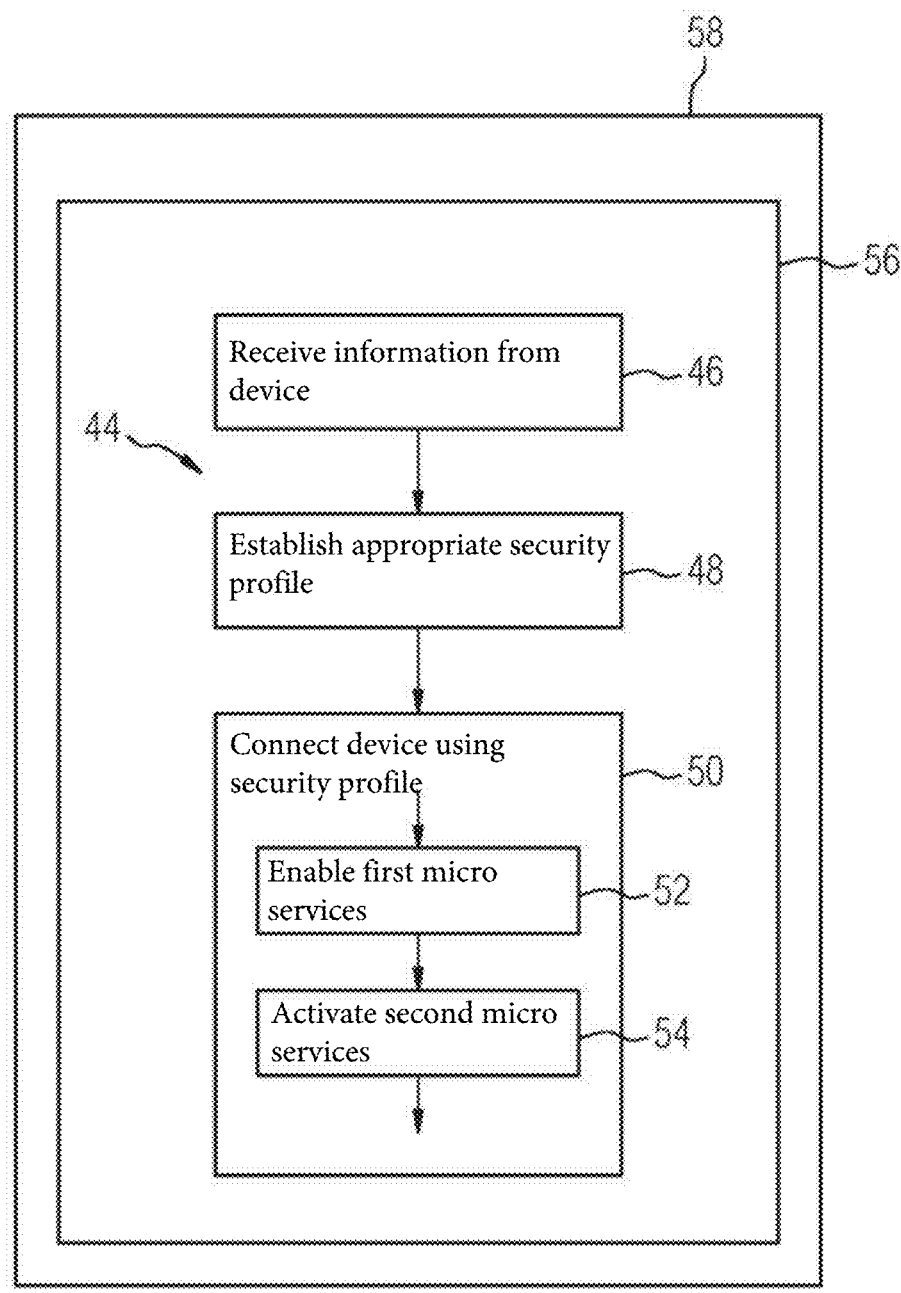
FIG. 4 depicts a computer program as an example for the implementation of the method described here.

The diagram in FIG. 4 shows, in a schematic simplified form, a computer program 44 in the form of a flow diagram as an example of an implementation of the method in software. Accordingly, the method includes a first act 46, during which a device 12-16 connects to the concierge service 24 of the cloud 10 and transfers to the latter information relating to the security functions provided by the device 12-16. During the first act 46, the concierge service 24 receives this information from the device 12-16 that is seeking connection to the cloud 10. In a subsequent second act 48, the concierge service 24 establishes an appropriate security profile for the device 12-16 based on the information transferred by the device 12-16 during the first act 46 about the device's security functions. In a third act 50, the concierge service 24 connects the requesting device 12-16 to a communication channel 26-30 appropriate to the established security profile. A fourth act 52, or a fourth act 52 and a fifth act 54, optionally belong to the third act 50.

In the fourth act 52, there is an enabling of predetermined or predeterminable first micro services 40 from a group of first micro services 40 for the device 12-16. In the fifth act 54, there is an activation of predetermined or predeterminable second micro services 42 from a group of second micro services 42 for monitoring the data transmitted via the selected communication channel 26-30. The first and/or second micro services 40, 42 are predetermined or predeterminable for example in the form of corresponding data in the configuration database 34.

As is shown in simplified schematic form in FIG. 4, the computer program 44 with an implementation of the method presented here and where necessary individual or a number of forms of embodiment are loaded into a memory 56 of a processing unit 58, for example a processing unit 58 functioning as a gateway in the cloud 10 to the cloud 10, and are executed during operation of the processing unit 58 for connection of devices 12-16 to the cloud 10.

Although the disclosure has been illustrated and described in greater detail by the exemplary embodiments, the disclosure is not restricted by the disclosed example or examples and other variations may be derived herefrom by the person skilled in the art, without departing from the scope of protection of the disclosure.

Individual prominent aspects of the disclosure submitted here may thus be briefly summarized as follows. The disclosure makes possible a secure connection of devices 12-16 to the cloud 10, in that the respective device 12-16 is first of all connected to a concierge service 24 of the cloud 10 and transfers to the service information relating to the security functions provided by the device 12-16, whereupon the concierge service 24, based on the information about its security functions transferred by the requesting device 12-16, establishes a security profile appropriate for the device 12-16 and connects the requesting device 12-16 to a communication channel 26-30 from a group of a number of communication channels 26-30 appropriate to the established security profile, so that each client 12-16 connected by the concierge service 24 to the cloud 10 uses a communication channel 26-30 corresponding to its respective security profile, wherein in embodiments of the method with each communication channel 26-30 and/or a security profile, further security profile-specific control options may be additionally provided, for example, an especially fundamental checking of data transmitted via an unsecured communication channel 26-30 and/or restricted functions for a client 12-18 depending on its security profile and/or the communication channel 26-30 used.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for secure connection of devices to a cloud, the method comprising:
   connecting a device to a concierge service of the cloud, wherein the device is not part of the cloud, and wherein the concierge service is within the cloud;
   receiving, by the concierge service from the device, information relating to security functions of the device, wherein the information comprises a computing power of the device;
   establishing, by the concierge service, an appropriate security profile for the device out of a plurality of different levels of security profiles based on the computing power of the device; and
   connecting, by the concierge service, the device to a communication channel of a group of communication channels,
   wherein the group of communication channels comprises two or more channels having different levels of security selected from the group consisting of asymmetric encryption, symmetric encryption, a mix of encrypted and unencrypted data, and unencrypted data,
   wherein the group of communication channels are within the cloud or part of an interface within the cloud, and
   wherein the connected communication channel is appropriate for the established security profile for communication with the cloud based on the computing power of the device.

2. The method of claim 1, wherein the connection of the device to the communication channel comprises linking the device to an enabling of predetermined or predeterminable first micro services from a group of first micro services for the device.

3. The method of claim 2, wherein the connection of the device to the communication channel comprises linking the device to an activation of predetermined or predeterminable second micro services from a group of second micro services for monitoring data transmitted via the communication channel.

4. The method of claim 3, wherein the connection of the device to the communication channel is done in accordance with data in a channel configuration database accessible for the concierge service.

5. A computer program product with program code stored on a non-transitory computer-readable data medium, wherein, when the computer program product is executed on a processing unit functioning as an interface in a cloud, the computer program product causes the processing unit to:
   connect a device to a concierge service of the cloud, wherein the device is not part of the cloud, and wherein the concierge service is within the cloud;
   receive information relating to security functions of the device, wherein the information comprises a computing power of the device;
   establish an appropriate security profile for the device out of a plurality of different levels of security profiles based on the computing power of the device; and
   connect the device to a communication channel of a group of communication channels,
   wherein the group of communication channels comprises two or more channels having different levels of security selected from the group consisting of asymmetric encryption, symmetric encryption, a mix of encrypted and unencrypted data, and unencrypted data,
   wherein the group of communication channels are within the cloud or part of an interface within the cloud, and
   wherein the connected communication channel is appropriate for the established security profile for communication with the cloud based on the computing power of the device.

6. A processing unit with a non-transitory memory, into which a computer program is loaded, wherein when the computer program is executed by the processing unit, the processing unit is configured to:
   connect a device to a concierge service of a cloud, wherein the device is not part of the cloud, and wherein the concierge service is within the cloud;
   receive information relating to security functions of the device, wherein the information comprises a computing power of the device;
   establish an appropriate security profile for the device out of a plurality of different levels of security profiles based on the computing power of the device; and
   connect the device to a communication channel of a group of communication channels,
   wherein the group of communication channels comprises two or more channels having different levels of security selected from the group consisting of asymmetric encryption, symmetric encryption, a mix of encrypted and unencrypted data, and unencrypted data,
   wherein the group of communication channels are within the cloud or part of an interface within the cloud, and
   wherein the connected communication channel is appropriate for the established security profile for communication with the cloud based on the computing power of the device.

7. The method of claim 1, wherein the connection of the device to the communication channel comprises linking the device to an activation of predetermined or predeterminable micro services from a group of micro services for monitoring data transmitted via the communication channel.

8. The method of claim 7, wherein the connection of the device to the communication channel is done in accordance with data in a channel configuration database accessible for the concierge service.

9. The method of claim 2, wherein the connection of the device to the communication channel is done in accordance with data in a channel configuration database accessible for the concierge service.

10. The method of claim 1, wherein the connection of the device to the communication channel is done in accordance with data in a channel configuration database accessible for the concierge service.

11. The method of claim 1, wherein the establishing of the appropriate security profile for the device comprises the concierge service using a lookup table to determine the appropriate security profile.

* * * * *